(12) United States Patent
Joo

(10) Patent No.: US 9,568,749 B2
(45) Date of Patent: Feb. 14, 2017

(54) FORGERY AND FALSIFICATION PREVENTION DEVICE

(71) Applicant: NANOBRICK CO., LTD., Suwon-si (KR)

(72) Inventor: Jae Hyun Joo, Suwon-si (KR)

(73) Assignee: NANOBRICK CO., LTD. (KR)

( * ) Notice: Subject to any disclaimer, the term of this patent is extended or adjusted under 35 U.S.C. 154(b) by 0 days.

(21) Appl. No.: 14/440,146

(22) PCT Filed: Nov. 14, 2013

(86) PCT No.: PCT/KR2013/010352
§ 371 (c)(1),
(2) Date: May 1, 2015

(87) PCT Pub. No.: WO2014/077604
PCT Pub. Date: May 22, 2014

(65) Prior Publication Data
US 2015/0323815 A1    Nov. 12, 2015

(30) Foreign Application Priority Data

| Nov. 14, 2012 | (KR) | 10-2012-0128816 |
| Jun. 18, 2013 | (KR) | 10-2013-0069590 |
| Nov. 8, 2013 | (KR) | 10-2013-0135781 |

(51) Int. Cl.
*G02F 1/167* (2006.01)
*G02F 1/01* (2006.01)
(Continued)

(52) U.S. Cl.
CPC ............... *G02F 1/01* (2013.01); *B42D 25/36* (2014.10); *G02F 1/09* (2013.01); *G02F 1/167* (2013.01);
(Continued)

(58) Field of Classification Search
CPC ............... G02F 1/01; G02F 1/09; G02F 1/19; G02F 1/29; G02F 1/167; G06K 9/18; G07D 7/02; G07D 7/2066; B42D 25/36
(Continued)

(56) References Cited

U.S. PATENT DOCUMENTS

| 8,040,583 B2 * | 10/2011 | Takahashi | G02B 3/0056 359/228 |
| 2006/0148104 A1 | 7/2006 | Marini et al. | |
| 2013/0293943 A1 | 11/2013 | Joo et al. | |

FOREIGN PATENT DOCUMENTS

| EP | 2860500 | 4/2015 |
| KR | 20100101549 | 9/2010 |

(Continued)

OTHER PUBLICATIONS

International Search Report—PCT/KR2013/010352 dated Mar. 3, 2014.
(Continued)

*Primary Examiner* — Tuyen Tra
(74) *Attorney, Agent, or Firm* — Fitch Even Tabin & Flannery LLP

(57) ABSTRACT

A forgery and falsification prevention device includes: a variable material containing unit that contains a variable material in which reflected light or transmitted light is changed in response to an application of a display stimulus; and an operation unit that performs a function of changing a display state of the variable material when an external stimulus is applied, by changing light reflection characteristics or light transmission characteristics of the variable material or changing the display stimulus which is applied to the variable material.

17 Claims, 14 Drawing Sheets

(51) Int. Cl.
   *G02F 1/29*     (2006.01)
   *G07D 7/02*     (2016.01)
   *G07D 7/20*     (2016.01)
   *B42D 25/36*    (2014.01)
   *G02F 1/09*     (2006.01)
   *G02F 1/19*     (2006.01)
(52) U.S. Cl.
   CPC . *G02F 1/19* (2013.01); *G02F 1/29* (2013.01); *G07D 7/02* (2013.01); *G07D 7/2066* (2013.01)
(58) Field of Classification Search
   USPC .................................. 359/238, 296; 345/107
   See application file for complete search history.

(56) References Cited

FOREIGN PATENT DOCUMENTS

| | | |
|---|---|---|
| KR | 101016922 | 2/2011 |
| KR | 1020110029222 | 3/2011 |
| KR | 1020110050612 | 5/2011 |
| KR | 1020110053929 | 5/2011 |
| KR | 1020120082380 | 7/2012 |
| WO | 2011049570 | 4/2011 |
| WO | 2012018209 | 2/2012 |

OTHER PUBLICATIONS

European Search Report—European Application No. 13854615.5, issued on Apr. 1, 2016, citing WO 2012/018209, US 2013/293943, KR 2011 0050612, KR 2010 0101549, KR 2012 0082380, EP 2 860 500, US 2006/148104 and WO 2011/049570.

* cited by examiner

Low ←——————————→ High
Intensity of Magnetic Field (a)            (b)

(a)　　　　　　(b)　　　　　　(c)

(a)　　　　　　　　　　　(b)

(a)

(b)

(a)

(b)

(a)

(b)

(a)

(b)

FORGERY AND FALSIFICATION PREVENTION DEVICE

TECHNICAL FIELD

The present invention relates to a forgery and falsification prevention device. More particularly, the present invention relates to a device to allow a user to determine whether an object of forgery and falsification prevention is forged or falsified, the device comprising: a variable substance container to contain a variable substance in which a reflected light or transmitted light is changed a as a display stimulus, such as an electric field, a magnetic field, temperature, humidity, pressure, or light, is applied thereto; and a movable part to change light reflective characteristics or light-transmissive characteristic of the variable substance or change the display stimulus applied to the variable substance in response to a given external stimulus.

BACKGROUND ART

Various techniques have been introduced to prevent counterfeit and alteration of high-priced goods or goods having contents of which authenticity is required. Conventionally, techniques using fine patterns, braille, hologram, RFID and the like have been mainly used to prevent counterfeit and alteration of goods. However, such conventional techniques have limitations in that it is difficult for an ordinary user to determine whether goods are counterfeited or altered, or have problems in that it costs a lot to manufacture a means for preventing counterfeit and alteration.

In this regard, the inventor has developed a method and apparatus which allow an ordinary user to easily determine whether an object of counterfeit and alteration prevention is counterfeited or altered using a substance of which color or light transmittance is changed as a magnetic field is applied thereto.

DETAILED DESCRIPTION OF THE INVENTION

Technical Problem

One object of the invention is to solve all the above-described problems.

Another object of the present invention is to provide a forgery and falsification prevention device capable of changing the display state of a variable substance by including: a variable substance container to contain a variable substance in which a reflected light or transmitted light is changed in response to application of a display stimulus, such as an electric field, a magnetic field, temperature, humidity, pressure, or light; and a movable part to change light reflective characteristics or light-transmissive characteristic of the variable substance or change the display stimulus applied to the variable substance in response to a given external stimulus.

Technical Solution

A forgery and falsification prevention device according to the present invention includes a variable substance container to contain a variable substance in which a reflected light or transmitted light is changed as a display stimulus is applied thereto; and a movable part to perform a function of changing a display state of the variable substance by changing light reflection characteristics or light transmission characteristics of the variable substance or changing the display stimulus applied to the variable substance, in response to a given external stimulus.

The display stimulus may include at least one of an electric field, a magnetic field, temperature, humidity, pressure, and light.

The movable part may be moved, rotated, or deformed in response to the given externalstimulus to change at least one of intensity, direction, and pattern of the display stimulus applied to the variable substance.

The movable part may be moved, rotated, or deformed in response to the given externalstimulus to position the variable substance container in a region where the display stimulus is applied.

The movable part may be moved, rotated, or deformed in response to the given externalstimulus to position the variable substance contained in the variable substance container in a region where the display stimulus is applied.

The forgery and falsification prevention device may further include a display stimulus generator to generate a display stimulus capable of being applied to the variable substance container, and the movable part may be moved, rotated or deformed in response to the given externalstimulus, to position the display stimulus generator in a region where the display stimulus can be applied to the variable substance.

Here, at least one of the variable substance container and the movable part may be irreversiblyfractured by the external stimulus, and when at least one of the variable substance container and the movable part is irreversiblyfractured, the light reflection characteristics or light transmission characteristics of the variable substance, which show in response to application of the display stimulus, may be changed compared with before at least one of the variable substance container and the movable part is irreversiblyfractured.

Here, in the variable substance container, the display state of a first region to which the display stimulus is applied may be different from the display state of a second region to which the display stimulus is not applied.

Here, at least one of the variable substance container and the movable part may be configured in the form of at least one of a container plug, a tag, a card, a film, a sticker, and an identification code.

The variable substance may include a solution in which particles are dispersed, and the intervals or positions of the particles are changed according to the change in an electric field or a magnetic field.

The variable substance may include at least one of a fluorescent material, a phosphorescent material, a quantum dot material, a temperature indicating material, and an optically variable pigment (OVP) material.

The variable substance may include a first medium having a first refractive index and a second medium having a second refractive index, and the first medium and the second medium may be regularly arranged.

The first medium and the second medium may be alternately stacked.

The phase or refractive index of at least one of the first medium and the second medium may be changed in response to the application of the display stimulus.

Here, particles having a refractive index different from the first refractive index may be dispersed in the first medium.

The first medium may include a curable material, and when the curable material is cured while the particles are regularly arranged at predetermined intervals in the first medium by the display stimulus, the first medium may be cured, and thus the state of the particles being regularly arranged at predetermined intervals in the first medium may be irreversibly fixed.

Here, at least one of the first medium and the second medium may be encapsulated or partitioned into a capsule made of a light-transmissive material.

Here, at least one of the first medium and the second medium may be dispersed in the form of a droplet within a light-transmissive material.

The forgery and falsification prevention device may further include an additional forgery and falsification prevention means using at least one of a hologram, radio frequency identification (RFID), and biometric information recognition.

The forgery and falsification prevention device may further include a display stimulus generator to generate an electric field as a display stimulus capable of being applied to the variable substance container when an electromagnetic wave is applied, and the movable part may be moved, rotated, or deformed in response to the application of the externalstimulus to position the display stimulus generator in a region where the electromagnetic wave is applied, and when the display stimulus generator is positioned in a region where the electromagnetic wave is applied, an electric field generated by the display stimulus generator may be applied to the variable substance container, thereby changing the display state of the variable substance.

The electromagnetic wave may include an electromagnetic wave generated during a near field communication (NFC) or radio frequency identification (RFID) process.

Advantageous Effects

According to the present invention, an ordinary user may easily determine whether an object of forgery and falsification prevention is forged or falsified by merely operating the movable part and observing an indication state of the variable substance with the naked eye.

EXPLANATION OF REFERENCE NUMERALS

Figure 1:
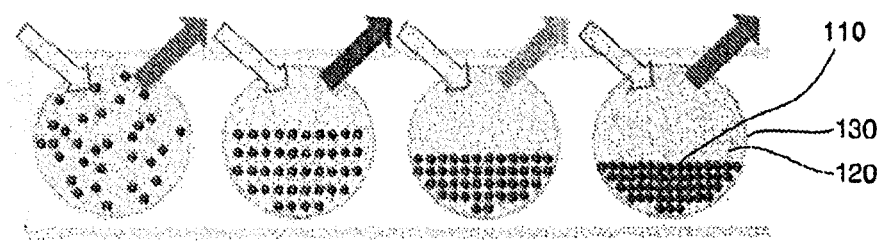
FIG. 1 illustratively shows a principle of adjusting a wavelength of light reflected from a variable substance according to one embodiment of the invention.

110: particle
120: solvent
130: capsule
610: particle
620: solvent
630: capsule

Embodiments of the Invention

In the following detailed description of the present invention, references are made to the accompanying drawings that show, by way of illustration, specific embodiments in which the invention may be practiced. These embodiments are described in sufficient detail to enable those skilled in the art to practice the invention. It shall be understood that the various embodiments of the invention, although different from each other, are not necessarily mutually exclusive. For example, specific shapes, structures and characteristics described herein may be implemented as modified from one embodiment to another without departing from the spirit and scope of the invention. In addition, it shall be understood that the locations or arrangements of individual elements within each of the disclosed embodiments may also be modified without departing from the spirit and scope of the invention. Accordingly, the following detailed description is not to be taken in a limiting sense, and the scope of the invention, if properly described, is limited only by the appended claims together with all equivalents thereof. In the drawings, like reference numerals refer to the same or similar functions throughout the several views.

Hereinafter, the configurations of the present invention will be described in detail with reference to the accompanying drawings so that those skilled in the art to which the invention pertains may easily implement the invention.

[Configuration of a variable substance]

According to an embodiment of the present invention, a variable substance may include a material in which a reflected light or transmitted light is changed as a display stimulus, such as an electric field, a magnetic field, temperature, humidity, pressure, or light, is applied thereto.

According to an embodiment of the present invention, the variable substance may include a material in which a reflected light or transmitted light is changed in response to application of a magnetic field as a display stimulus.

According to an embodiment of the present invention, the variable substance may include particles that are magnetic so that they are rotatable or movable when subjected to a magnetic force by a magnetic field. For example, the particles may include a magnetic material such as nickel (Ni), iron (Fe), or cobalt (Co).

Further, according to one embodiment of the invention, the particles may include a material which becomes magnetic (i.e. becomes magnetized) when a magnetic field is applied thereto. In particular, according to one embodiment of the invention, a superparamagnetic material, which is magnetized when an external magnetic field is applied thereto but does not have a remanent magnetization when no external magnetic field is applied thereto, may be employed to prevent magnetic particles from agglomerating together when no magnetic field is externally applied thereto.

Furthermore, according to one embodiment of the invention, the surface of the particles may be coated with charges having the same polarity so that the particles may be well dispersed in a solvent without being flocculated. In addition, in order to prevent the particles from being precipitated in the solvent, a material having a specific gravity different from that of the particles may be coated on the surface of the particles, or may be mixed with the solvent.

In addition, according to an embodiment of the present invention, when a magnetic field as a display stimulus is applied, an attractive force that acts on the particles by the magnetic field and a repulsive force between particles caused by the charges having the same polarity on the surface of the particles are balanced so that the intervals between the particles are regularly controlled, thereby forming photonic crystals, and a light of a specific wavelength may be reflected from the photonic crystals.

Further, according to one embodiment of the invention, the particles may be configured to reflect light having a specific wavelength, i.e., to have a specific color. More particularly, the particles according to the invention may have a specific color by adjusting an oxidation state thereof or by coating an inorganic pigment, dye or the like thereon. For example, Zn, Pb, Ti, Cd, Fe, As, Co, Mg, Al or the like including a chromophoric group may be used as the inorganic pigment coated on the particles according to the invention, in the form of oxide, emulsion or lactate, and a fluorescent dye, acidic dye, basic dye, mordant dye, sulfide dye, vat dye, dispersed dye, reactive dye or the like may be used as the dye coated on the particles according to the invention. In addition, according to one embodiment of the invention, the particles included in the magnetically responsive substance may consist of a fluorescent material, a phosphorescent material, a quantum dot material, a temperature indicating material, an optically variable pigment (OVP) material, or the like.

Furthermore, according to one embodiment of the invention, silica, polymer, monomer or the like may be coated on the surface of the particles so that the particles may have high dispersibility and stability in the solvent.

Meanwhile, the diameter of the particles according to the invention may range from tens of nanometers to tens of micrometers, but not limited thereto.

Hereinafter, the configuration of a solvent included in the variable substance will be described in detail.

According to one embodiment of the invention, the solvent may consist of a material having a specific gravity similar to that of the particles so that the particles may be evenly dispersed therein, or a material suitable for allowing the particles to be stably dispersed in the solvent. For example, the material may include halogen carbon oil, dimethyl silicon oil or the like, which has a low dielectric constant.

Further, according to one embodiment of the invention, the solvent may be configured to reflect light having a specific wavelength, i.e., to have a specific color. More specifically, the solvent according to the invention may include a material having an inorganic pigment or a dye, or a material having a structural color based on photonic crystals.

Furthermore, according to one embodiment of the invention, by allowing magnetic particles to be evenly dispersed in a fat-soluble solvent, it is possible to prevent the particles from agglomerating together or adhering to an inner wall of a capsule in an encapsulation process.

However, the configurations of the particles and the solvent according to the invention are not limited to those described above, and may be appropriately modified as long as the objects of the invention may be achieved.

Next, it will be described in detail how the particles and solvent included in the variable substance according to the invention are encapsulated or partitioned.

According to one embodiment of the invention, the particles may be encapsulated into a plurality of capsules made of a light-transmissive material as dispersed in the solvent. According to one embodiment of the invention, occurrence of direct interference such as intermixing between different capsules may be prevented by encapsulating the particles and solvent, so that the particles included in the variable substance may be independently controlled for each capsule. As a result, light transmission may be adjusted in more various patterns and light transmittance control characteristics may be improved.

For example, gelatin, acacia, melamine, urea, protein, polysaccharide or the like may be used as a material constituting the capsules according to one embodiment of the invention, and a material for fixing the capsules (i.e., a binder) may be used. However, the configuration of the capsules according to the invention is not necessarily limited to the above-described examples, and any material may be used as the material for the capsules according to the invention as long as it is light-transmissive, physically strong, elastic but not hard, non-porous, and resistant to external heat and pressure.

In addition, according to one embodiment of the invention, the particles may be partitioned as dispersed in the solvent. According to one embodiment of the invention, direct interference such as intermixing between different cells divided by partitions may be prevented, and thus the particles included in a variable substance container to be described later may be independently controlled for each capsule.

Meanwhile, according to another embodiment of the invention, the variable substance may include a material in which a reflected light or transmitted light is changed when an electric field as a display stimulus is applied.

According to another embodiment of the present invention, when particles that are electrically charged with the same polarity are dispersed in a solvent within the variable substance and then an electric field as a display stimulus is applied thereto, an attractive force that acts on the particles by the electric field and a repulsive force between particles caused by the charges having the same polarity on the surface of the particles are balanced so that the intervals between the particles are regularly controlled, thereby forming photonic crystals, and a light of a specific wavelength may be reflected from the photonic crystals.

In addition, according to another embodiment of the present invention, when particles having an intrinsic color and charges of the same polarity are dispersed in a solvent within the variable substance and then an electric field as a display stimulus is applied thereto, the particles move in a predetermined direction due to electrophoresis, and an intrinsic color of the moved particles can be displayed.

Meanwhile, according to still another embodiment of the present invention, the variable substance may include a material in which a reflected light or transmitted light is changed as a display stimulus other than an electric field or magnetic field is applied thereto.

According to an embodiment of the present invention, the variable substance may include a first medium having a first refractive index and a second medium having a second refractive index, the first medium and the second medium being regularly arranged. Particularly, the first medium and the second medium contained in the variable substance may be alternately stacked.

In addition, according to an embodiment of the present invention, a phase or a refractive index of the first medium or the second medium of the variable substance may be changed in response to application of the display stimulus, and thus the display state of the variable substance may be changed. For example, the phase or refractive index of the first medium or the second medium may be changed by light incident from outside, a change in humidity, or an electric field or magnetic field that is applied.

In addition, according to an embodiment of the present invention, particles having a refractive index different from the first refractive index, which is a refractive index of the first medium, may be dispersed in the first medium of the variable substance, and the arrangement state of the particles is changed by the display stimulus, and therefore the display state of the variable substance may be changed.

In addition, according to an embodiment of the present invention, particles having a refractive index different from the first refractive index, which is a refractive index of the first medium, may be dispersed in the first medium of the variable substance, and a curable material that can be cured under certain conditions, e.g., temperature, ultraviolet light, ions, or the like, may be contained in the first medium of the variable substance. In this case, if the first medium is cured by the curable material while the particles are regularly arranged at predetermined intervals in the first medium in response to application of the display stimulus, the state of the particles being regularly arranged at predetermined intervals in the first medium can be irreversibly fixed and maintained even though the display stimulus is not applied any more.

In addition, according to an embodiment of the present invention, the first medium or the second medium in the variable substance may be encapsulated or partitioned into a capsule made of a light-transmissive material, or may be scattered in the form of a droplet in the light-transmissive material. Here, the diameter of the capsule that contains the variable substance may be 1 μm to 5,000 μm.

In addition, according to an embodiment of the present invention, the first medium and the second medium in the variable substance may be formed of a transparent or distinctively colored material, and examples thereof may include water, methanol, ethanol, propanol, butanol, propylene carbonate, toluene, benzene, hexane, chloroform, Isopar-G, Isopar-M, and the like.

In addition, according to an embodiment of the present invention, the light-transmissive material that is used for the encapsulation or partitioning of the first medium or the second medium may be formed of a transparent polymeric material, and examples thereof may include aginate, gelatin, ethyl cellulose, polyamide, melamine formaldehyde, poly (vinyl pyridine), polystyrene, urethane, polyurethane, methyl methacrylate, and the like.

[Working Principle of Forgery and Falsification Prevention Device]

FIG. 1 illustratively shows a principle of adjusting a wavelength of light reflected from a variable substance according to one embodiment of the invention.

According to one embodiment of the invention, when a magnetic field is applied to a plurality of particles 110 which are magnetic and have charges on the surface thereof, a magnetic attractive force acts on the particles 110 in a predetermined direction due to the magnetism of each of the particles 110. Thus, a distance between the particles 110 gathered to one side is reduced, while a magnetic repulsive force caused by Coulomb's law (when the particles have the same surface charges) or a physical repulsive force caused by steric hindrance effects (when a hydrodynamic size of the particles is large due to a detecting functional group attached to the surface of the particles) acts between the particles 110. Accordingly, an interval of the particles 110 may be determined based on a relative strength between the attractive force caused by the magnetic field and the repulsive force between the particles caused by the charges. As a result, the particles 110 arranged at a predetermined interval may function as photonic crystals. That is, according to Bragg's law, a wavelength of light reflected from the particles 110 is determined by the interval of the particles 110, and thus the wavelength of the light reflected from the particles 110 may be adjusted by controlling the interval of the particles 110.

Here, a wavelength pattern of the reflected light may be varied depending on factors such as an intensity and direction of the magnetic field, a size and mass of the particles, refractive indices of the particles and the solvent, a magnetization value of the particles, an amount of the charges of the particles, and a concentration of the particles dispersed in the solvent.

Referring to FIG. 1, when no magnetic field is applied, the particles 110 may be irregularly arranged in a capsule 130. In this case, the particles 110 do not exhibit any specific color. Next, when a predetermined magnetic field is applied, an attractive force caused by the magnetic field and a repulsive force between the particles 110 caused by the charges may be balanced so that the particles 110 may be regularly arranged at a predetermined interval. As a result, the interval of the plurality of particles 110 may be controlled so that light having a specific wavelength may be reflected therefrom. In addition, when the intensity of the magnetic field applied to the particles 110 is increased, the attractive force caused by the magnetic field is also increased so that the interval of the particles 110 is narrowed and thus the wavelength of the light reflected from the particles 110 is shortened. That is, according to one embodiment of the invention, the wavelength of the light reflected from the particles 110 may be adjusted by adjusting the intensity of the magnetic field applied to the particles 110. As the intensity of the magnetic field is further increased, the wavelength of the light reflected from the particles may go beyond a visible light range and fall within an ultraviolet range. Then, the particles may transmit visible rays without reflecting them, and in this case, the light transmittance may be increased.

Meanwhile, according to one embodiment of the invention, the magnetically responsive substance consisting of the particles 110 and solvent 120 may be encapsulated into the capsule 130 made of a light-transmissive material, as shown in FIG. 1.

Figure 2:
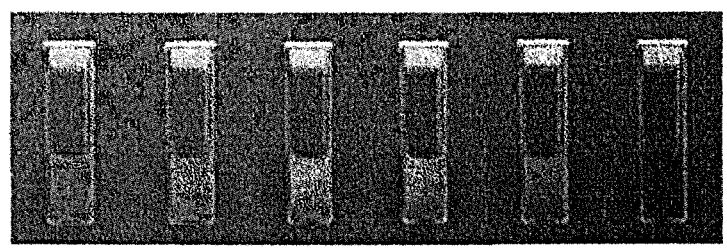
FIG. 2 shows a result of photographing color changes of a variable substance appearing when various intensities of magnetic fields are applied thereto according to one embodiment of the invention.

FIG. 2 shows a result of photographing color changes of a variable substance appearing when various intensities of magnetic fields are applied thereto according to one embodiment of the invention.

Referring to FIG. 2, it can be seen that as the intensities of the applied magnetic fields are adjusted, the light reflected from the particles may be adjusted to have any color ranging from red to green and to violet, i.e., in the entire visible light wavelength range.

Figure 3:
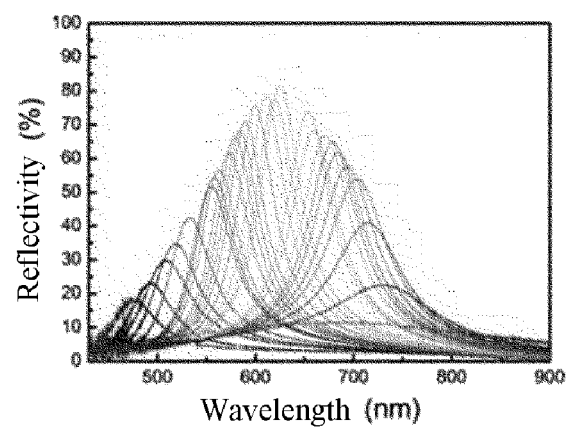
FIG. 3 shows a graph representing measured wavelengths of light reflected from a variable substance with regard to intensities of a magnetic field according to one embodiment of the invention.

FIG. 3 shows a graph representing measured wavelengths of light reflected from a variable substance with regard to intensities of a magnetic field according to one embodiment of the invention. It can be seen that as the intensity of the applied magnetic field is increased, the light is gradually changed from a reddish light having a long wavelength to a bluish light having a short wavelength.

Figure 4:
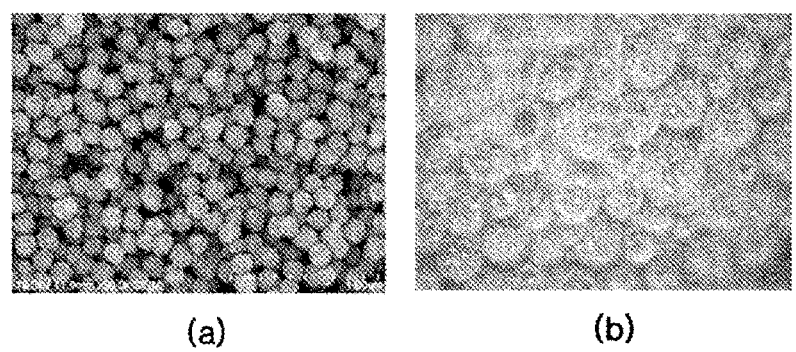
FIG. 4 shows an SEM photograph (a) of magnetic particles constituting a variable substance according to one embodiment of the invention, and a photograph (b) of the variable substance according to one embodiment of the invention being encapsulated into a capsule made of a light-transmissive material and then subjected to a magnetic field so that a greenish light is reflected therefrom.

(a) of FIG. 4 shows an SEM photograph of magnetic particles constituting a variable substance according to one embodiment of the invention. In (a) of FIG. 4, superparamagnetic $Fe_3O_4$ particles ranging from 50 nm to 300 nm are used as the magnetic particles.

(b) of FIG. 4 shows a photograph of the variable substance according to one embodiment of the invention being encapsulated into a capsule made of a light-transmissive material and then subjected to a magnetic field so that a greenish light is reflected therefrom. Referring to (b) of FIG. 4, it can be seen that the particles within the capsule are regularly arranged at a specific interval according to the magnetic field, and thus a greenish light in a specific wavelength range is mainly reflected.

Figure 5:
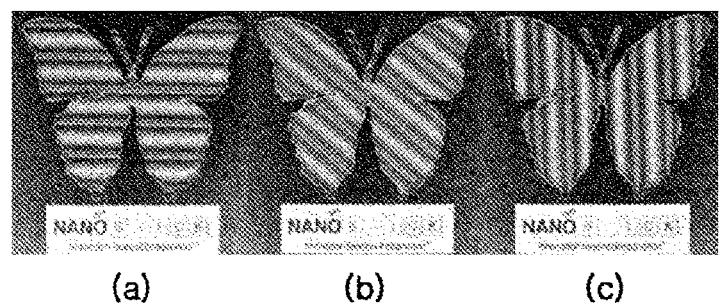
FIG. 5 shows photographs taken by observing changes in color and pattern of a variable substance according to one embodiment of the invention, wherein the variable substance is formed with a butterfly pattern thereon and positioned above a magnet in which magnetic poles for generating different intensities of magnetic fields are alternately formed in a stripe shape, and then the magnet is rotated.

FIG. 5 shows photographs taken by observing changes in color and pattern of a variable substance according to one embodiment of the invention, wherein the variable substance is formed with a butterfly pattern thereon and positioned above a magnet in which magnetic poles for generating different intensities of magnetic fields are alternately formed in a stripe shape, and then the magnet is rotated.

Meanwhile, according to one embodiment of the invention, the variable substance may include particles having magnetophoretic properties.

Specifically, when a magnetic field is applied to the variable substance according to one embodiment of the invention, the magnetic particles may be moved in the same direction as the magnetic field or in the opposite direction. As a result, an inherent color of the particles or the solvent may be indicated.

Meanwhile, according to one embodiment of the invention, the variable substance may include a material having a light transmittance which may be changed as a magnetic field is applied thereto.

Figure 6:
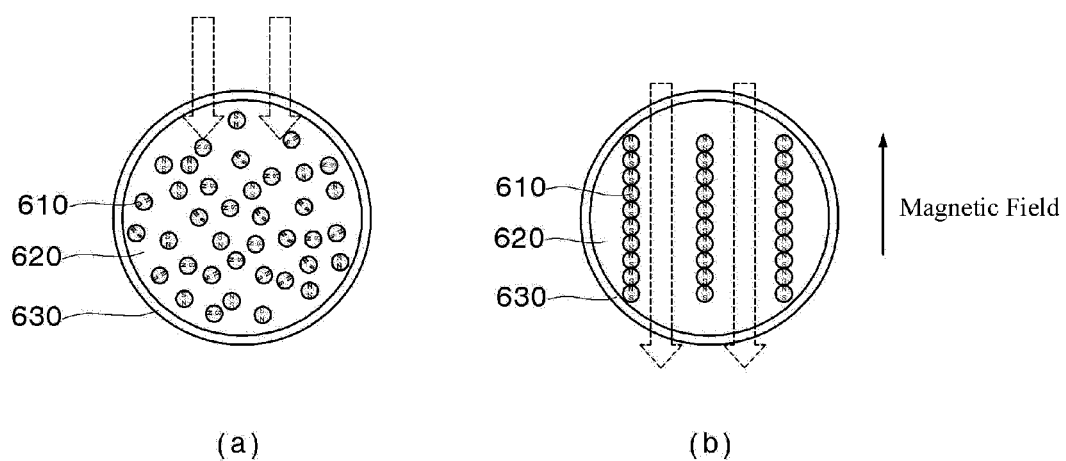
FIG. 6 illustratively shows how light transmittance of a variable substance is changed according to one embodiment of the invention.

FIG. 6 illustratively shows how light transmittance of a variable substance is changed according to one embodiment of the invention.

Referring to FIG. 6, a variable substance container according to an embodiment of the present invention may include a plurality of magnetic particles 610, a solvent 620 and a capsule 630, and the plurality of magnetic particles 610 may be contained in the capsule 630 as dispersed in the solvent 620.

First, referring to (a) of FIG. 6, when no magnetic field is applied to the variable substance container, the plurality of magnetic particles 610 may be irregularly dispersed in the capsule 630. In this case, the transmittance of light incident on the variable substance is not particularly controlled. That is, the light incident on the variable substance is scattered or reflected by the plurality of irregularly dispersed particles 110, and thus the light transmittance becomes relatively low.

Next, referring to (b) of FIG. 6, when a magnetic field is applied to the variable substance, the plurality of magnetic particles 110 within the capsule 130 may be arranged in a direction parallel to that of the magnetic field, and thus the transmittance of the light incident on the variable substance container may be controlled.

Specifically, when a magnetic field is applied to the variable substance according to one embodiment of the invention, each of the plurality of the particles 110, which are originally magnetic or magnetized by the magnetic field, may be rotated or moved such that a direction from S-pole to N-pole of the plurality of particles 110 is the same as that of the magnetic field. The N-pole and S-pole of each of the rotated or moved particles 110 become closer to the S-pole and N-pole of the nearby particles 110, respectively, so that a magnetic attractive or repulsive force is generated between the plurality of particles 110, and thus the plurality of particles 110 may be regularly aligned in a direction parallel to that of the magnetic field. That is, the plurality of particles 110 may be regularly aligned in a direction parallel to that of the vertically applied magnetic field. In this case, the light incident on the variable substance is less scattered or reflected by the plurality of particles 110, and thus the light transmittance becomes relatively high.

Although embodiments in which the display state of the variable substance is changed by the magnetic field are mainly described with reference to FIGS. 1 to 6, the present invention is not limited to the ones described above. Therefore, it should be understood that when an electric field is applied to a plurality of particles having charges of the same polarity, the display state of the variable substance can be changed according to the same principle described with reference to FIGS. 1 to 6.

[Forgery and falsification prevention device]

According to an embodiment of the present invention, the forgery and falsification prevention device may include a variable substance container, a display stimulus generator, and a movable part.

First, according to an embodiment of the present invention, the variable substance container may include a variable substance in which a reflected light or a transmitted light is changed in response to a display stimulus applied thereto. For example, the variable substance contained in the variable substance container may be configured (or adjusted) to reflect light having a specific wavelength or to indicate a specific light transmittance when a magnetic field or an electric field having a specific intensity and direction is applied thereto. As will be described below, the variable substance may be utilized as a visual indicator when an ordinary user determines with the naked eye whether an object of forgery and falsification prevention is authentic or not.

Further, according to one embodiment of the invention, the variable substance container may be configured to be fractured when the object of forgery and falsification prevention is opened. Thus, after the object of forgery and falsification prevention is opened, the light reflected or transmitted by the variable substance may not be changed even if a display stimulus is applied to the variable substance, and thererfore the variable substance may not reflect light having a predetermined wavelength or indicate a predetermined light transmittance.

Next, according to an embodiment of the present invention, the display stimulus generator may perform a function of generating a display stimulus that can be applied to the variable substance. Here, the display stimulus refers to a stimulus that can change the display state of the variable substance contained in the variable substance container, and may include, for example, an electric field, a magnetic field, temperature, humidity, pressure, light, electromagnetic wave, or the like.

According to an embodiment of the present invention, the display stimulus generator may be formed in a predetermined pattern, in order to allow the variable substance to display a predetermined color or a predetermined light transmittance in a predetermined pattern. For example, the display stimulus generator may generate a display stimulus according to a shape of a logo, a text, a barcode, a QR code, a figure, or the like, which is a reference to determine whether an object of forgery and falsification prevention is forged or falsified.

Next, according to an embodiment of the present invention, the movable part may perform a function of changing the display state of the variable substance by changing the state in which the display stimulus is applied to the variable substance (e.g., intensity, direction, or pattern of a magnetic field) in response to a given external stimulus. Here, the external stimulus given to the movable part refers to a stimulus induced by a user who desires to determine whether the an object of forgery and falsification prevention is authentic or not, a user who desires to open an object of forgery and falsification prevention, a user who desires to use an object of forgery and falsification prevention, and may include, for example, force, pressure, or the like.

Specifically, the movable part according to an embodiment of the present invention may be moved, rotated, or bent in response to a given external stimulus, to perform a function of positioning the variable substance container in a region where a display stimulus (e.g., magnetic field) generated by the display stimulus generator is applied.

In addition, the movable part according to an embodiment of the present invention may be moved, rotated, bent or fractured in response to the given external stimulus, to perform a function of positioning the variable substance contained in the variable substance container in a region where a display stimulus (e.g., magnetic field) generated by the display stimulus generator is applied.

In addition, the movable part according to an embodiment of the present invention may be moved, rotated, or bent in response to the given external stimulus, to perform a function of positioning the display stimulus generator in a region where a display stimulus (e.g., magnetic field) is applied to the variable substance.

Hereinafter, various embodiments of the forgery and falsification prevention device according to the present invention will be described with reference to the drawings.

Figure 7:
FIG. 7 illustratively shows how an identification code is marked using a variable substance in which a reflected light or transmitted light is changed as a display stimulus is applied thereto according to one embodiment of the invention.

FIG. 7 illustratively shows how an identification code is marked using a variable substance in which a reflected light or transmitted light is changed as a display stimulus is applied thereto according to one embodiment of the invention.

Referring to FIG. 7, a shape 710 of an identification code, such as a barcode or a QR code, may be patterned by partially forming a color-variable substance whose color is changed in response to a magnetic field or an electric field, or a light transmittance-variable substance whose light transmittance is changed in response to a magnetic field or an electric field, on a mother material, and thus the color or the light transmittance of a region that corresponds to the barcode or QR code may change when a magnetic field or an electric field as a display stimulus is applied. Meanwhile, even when a magnetic field or an electric field as a display stimulus is not applied, a color-variable substance having an intrinsic color or a light transmittance-variable substance may function as a barcode or QR code.

In addition, according to an embodiment of the present invention, the shape 710 of the identification code, such as a barcode or a QR code, may be patterned by using at least two kinds of color-variable substances having different color variable characteristics for the same magnetic field or electric field or at least two kinds of light transmittance-variable substances having different light transmittance variable characteristics in response to a magnetic field or an electric field. Here, additional information (not shown), such as a logo or a serial number, may be additionally patterned by forming at least two kinds of color-variable substances or light transmittance-variable substances in different regions, and thus when a magnetic field or an electric field as a display stimulus is applied, an identification code may be displayed or additional information, such as a logo or a serial number, that constitutes part of the identification code may be displayed.

Furthermore, according to an embodiment of the present invention, while the shape 710 of the identification code, such as a barcode or a QR code, may be formed by mixing a color-variable substance or a light transmittance-variable substance with an additive material, such as a UV paint, a temperature indicating paint, an OVP paint, or a fluorescent paint, and then simultaneously patterning the mixture, or separately patterning the materials in different regions, additional information, such as a logo or a serial number, may be additionally patterned in at least part of the region of the identification code, and thus when a magnetic field, an electric field, or light as a display stimulus is applied, the identification code may be displayed or the additional information, such as a logo or a serial number that constitutes part of the identification code, may be displayed.

In addition, according to an embodiment of the present invention, a color-variable substance or light transmittance-variable substance may be dispersed in a solvent that can be cured by ultraviolet light, heat or the like and then be coated on a mother material. Then, ultraviolet light or heat is partially applied only to a region 710 that corresponds to the shape of the identification code, such as a barcode or a QR code, while a magnetic field or an electric field as a display stimulus is applied, thereby curing the solvent in the region 710 that corresponds to the shape of the identification code so that the display state of the region is fixed. Therefore, after that, when a magnetic field or electric field as a display stimulus is applied, the color or the light transmittance can be changed only in a background region 720, except for the region that corresponds to the shape of the identification code.

On the other hand, according to an embodiment of the present invention, a color-variable substance or light transmittance-variable substance may be dispersed in a solvent that can be cured by ultraviolet light, heat or the like and then be coated on a mother material. Then, ultraviolet light or heat is partially applied only to the background region 720, except for the region that corresponds to the shape of the identification code, such as a barcode or a QR code, while a magnetic field or an electric field is applied from the outside, thereby curing the solvent in the background region 720, except for the region that corresponds to the shape of the identification code, so that the display state of the region is fixed. Therefore, after that, when a magnetic field or electric field as a display stimulus is applied, the color or the light transmittance can be changed only in the region 710 that corresponds to the shape of the identification code.

In addition, according to an embodiment of the present invention, while a mother material is bent in a particular shape to have curves, a color-variable substance or light transmittance-variable substance is formed thereon and then patterned in a shape of an identification code, such as a barcode or a QR code, so that the display state of the color-variable substance or light transmittance-variable substance is fixed. Therefore, when the mother material is bent in a particular shape by an external stimulus, the previously patterned identification code can be displayed.

In addition, according to an embodiment of the present invention, when an identification code is formed by using a color-variable substance or light transmittance-variable substance, a structure that is capable of inducing interference, such as a concavo-convex structure or a hologram, may be formed together.

In addition, according to an embodiment of the present invention, when an identification code is formed by using a color-variable substance or light transmittance-variable substance, other identification means such an RFID tag may be formed together.

In addition, according to an embodiment of the present invention, when an identification code is formed by using a color-variable substance or light transmittance-variable substance, the color-variable substance or light transmittance-variable substance may be patterned (that is, printed) while being encapsulated into a capsule made of a light-transmissive material.

In addition, according to an embodiment of the present invention, when an identification code is formed by using a color-variable substance or light transmittance-variable substance, the identification code may be patterned by utilizing a process of cutting and attaching a film that includes the color-variable substance or light transmittance-variable substance.

FIGS. 8 to 20 illustratively show the configurations of forgery and falsification prevention devices according to embodiments of the present invention.

Figure 8:
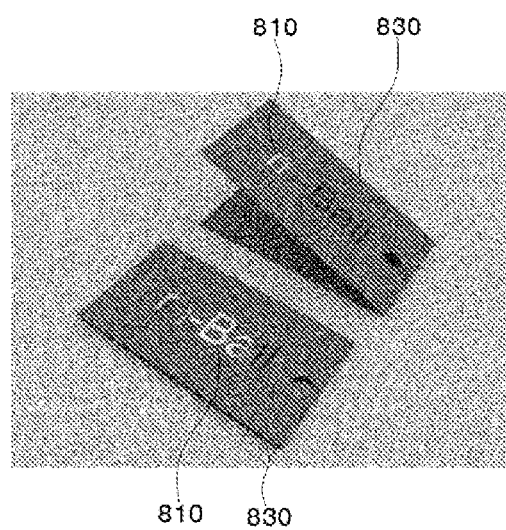
FIGS. 8 to 21 illustratively show the configurations of forgery and falsification prevention devices according to embodiments of the invention.

First, referring to FIG. 8, a variable substance container 810 that includes a variable substance encapsulated into a capsule made of a light-transmissive material may be printed on a movable part 830 in a shape of the letters "m-Ball", and when a magnetic field as a display stimulus is applied, the variable substance container 810 can display a predetermined color according to the shape of the letters "m-Ball".

Figure 9:
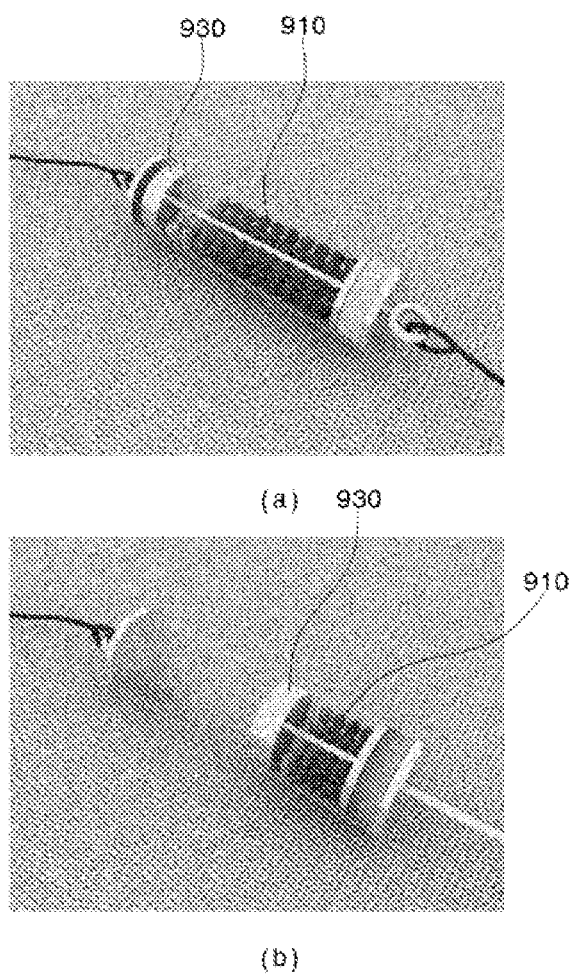
Figure 10:
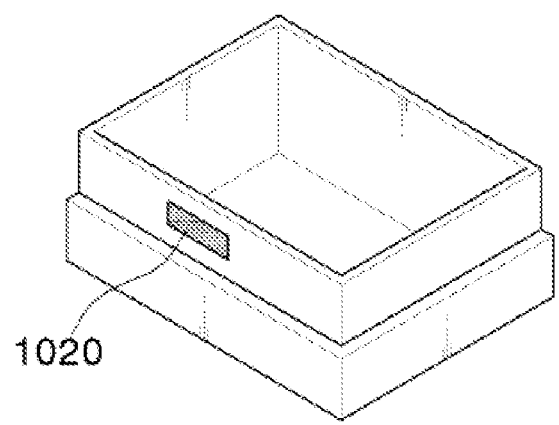
Figure 10:
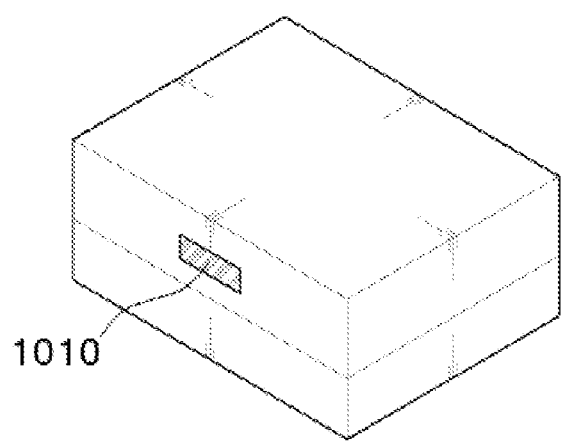
Figure 11:
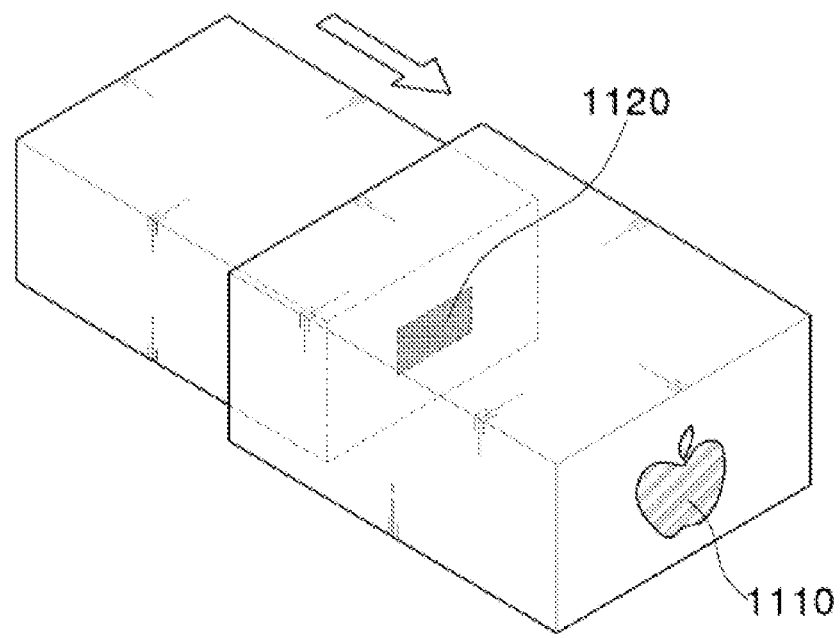
Figure 12:
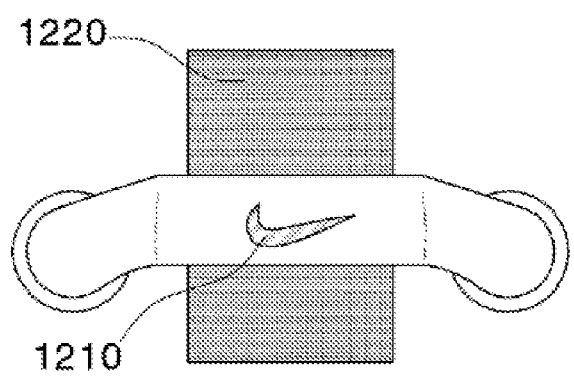
Figure 13:
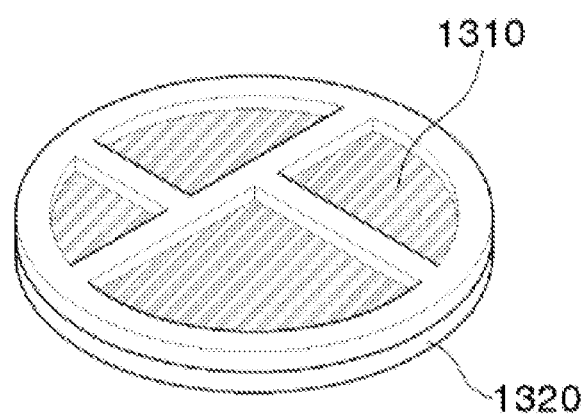
Figure 14:
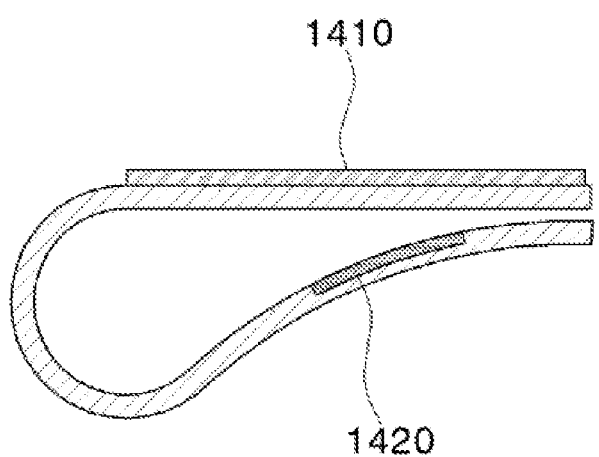
Figure 15:
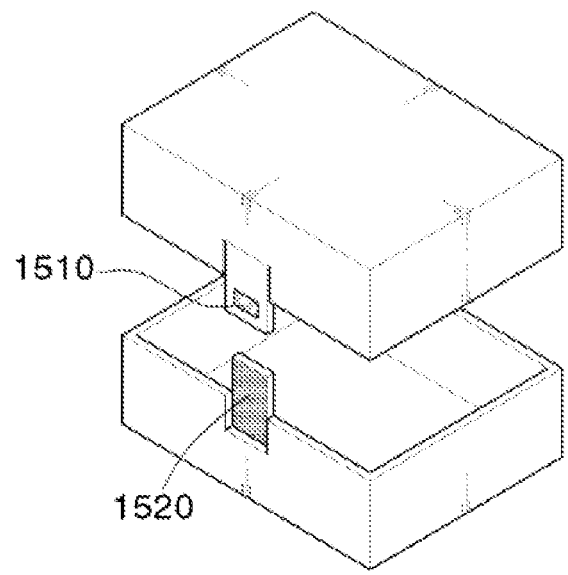

Next, referring to FIG. 9, various kinds of variable substances 910 with different colors may be encapsulated into capsules made of light-transmissive material and then be contained within a movable part 930. In the absence of an external stimulus, the intrinsic colors of the various kinds of variable substances 910 may be displayed distinctly (see (a) of FIG. 9). When an external stimulus, such as pressure, generated by a user's operation, is applied to the movable part 930, the capsules encapsulating the variable substances 910 are fractured due to the change of position of the movable part 930, and thus the various kinds of variable substances 910 are mixed together, thereby displaying a mixture of the intrinsic colors of the various kinds of variable substances 910 (see (b) of FIG. 9).

Next, referring to FIGS. 10 to 15, variable substance containers 1010, 1110, 1210, 1310, 1410, and 1510 may be printed on or attached in a shape of a film to an object of forgery and falsification prevention, such as a box-shaped packaging material, a button, or a clip, and when the variable substance containers 1010, 1110, 1210, 1310, 1410, and 1510 are positioned in the vicinity of display stimulus providers 1020, 1120, 1220, 1320, 1420, and 1520 by an external stimulus caused by a user's operation and therefore a magnetic field is applied to the variable substance containers 1010, 1110, 1210, 1310, 1410, and 1510, the variable substance containers 1010, 1110, 1210, 1310, 1410, and 1510 may display predetermined colors or predetermined light transmittances according to predetermined patterns. That is, according to the forgery and falsification prevention devices shown in FIGS. 10 to 15, as the object of forgery and falsification prevention, such as a box-shaped packaging material, a button, or a clip, is opened or closed, the positions of the variable substance containers 1010, 1110, 1210, 1310, 1410, and 1510 may be changed, and therefore the variable substance containers 1010, 1110, 1210, 1310, 1410, and 1510 may indicate predetermined display states.

Figure 16:
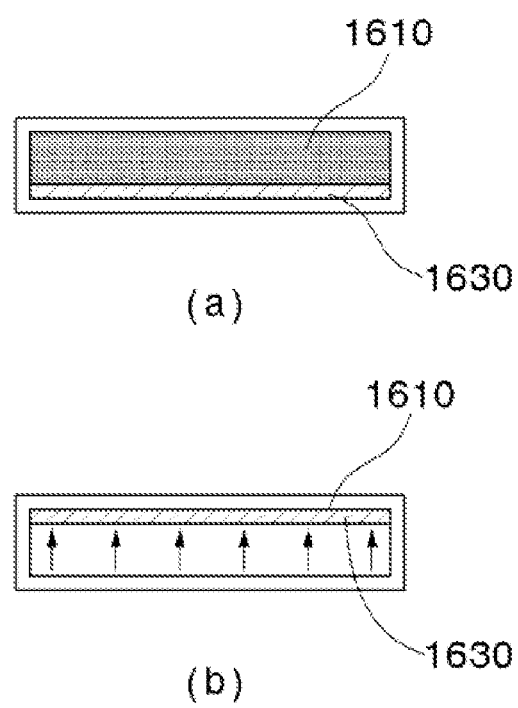
Figure 17:
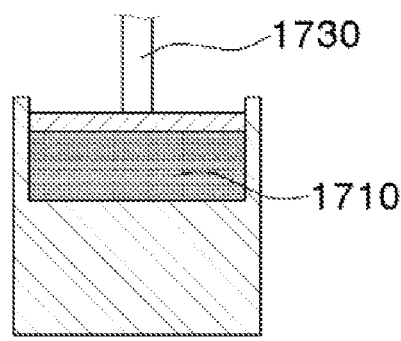
Figure 17:
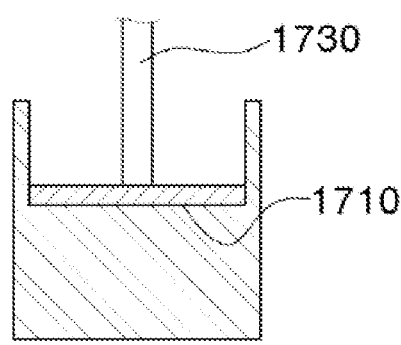

Next, referring to FIGS. 16 and 17, variable substance containers 1610 and 1710 may be disposed at a connection portion or a hinge portion of objects of forgery and falsification prevention. Specifically, movable parts 1630 and 1730 perform predetermined motions due to an external stimulus that is induced when the objects of forgery and falsification prevention are opened, to fracture the variable substance containers 1610 and 1710. Therefore, the variable substance containers 1610 and 1710 do not indicate any predetermined display states after the objects of forgery and falsification prevention are opened.

Figure 18:
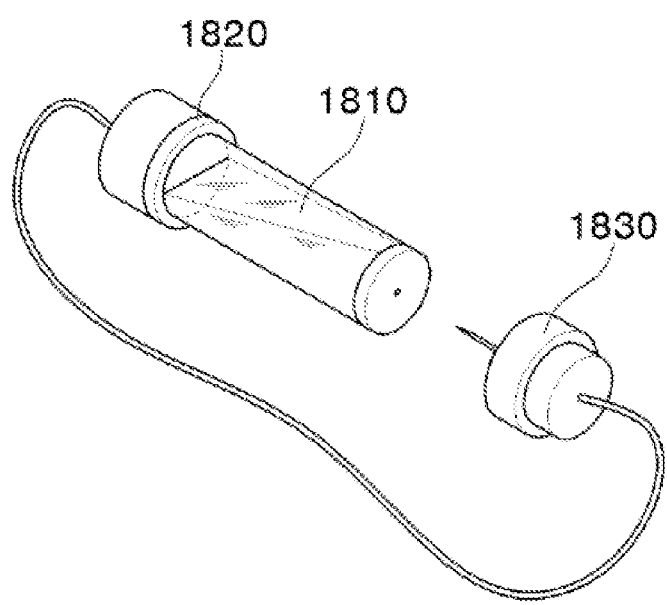
Figure 19:
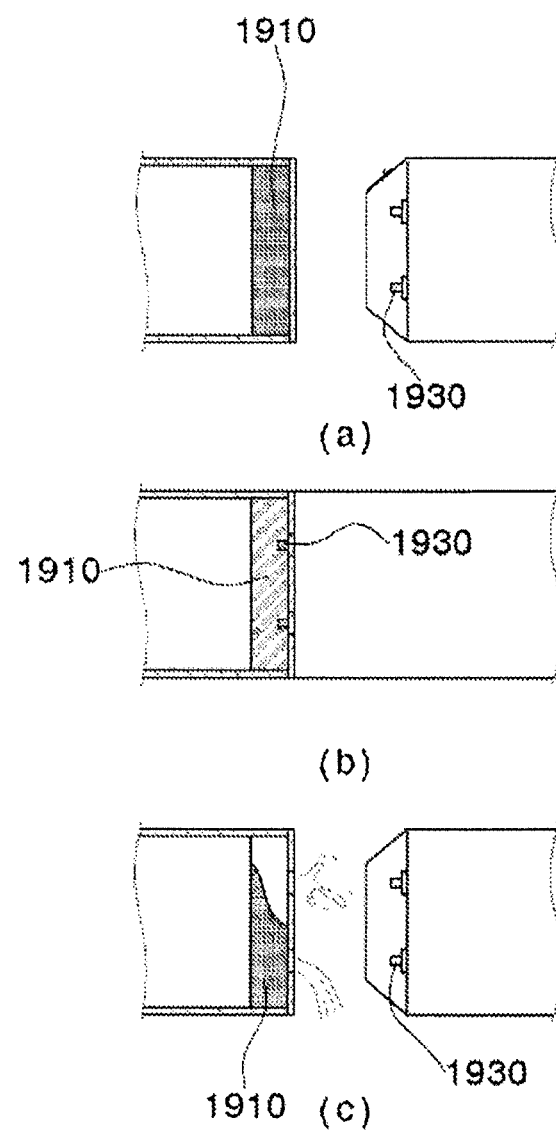
Figure 20:
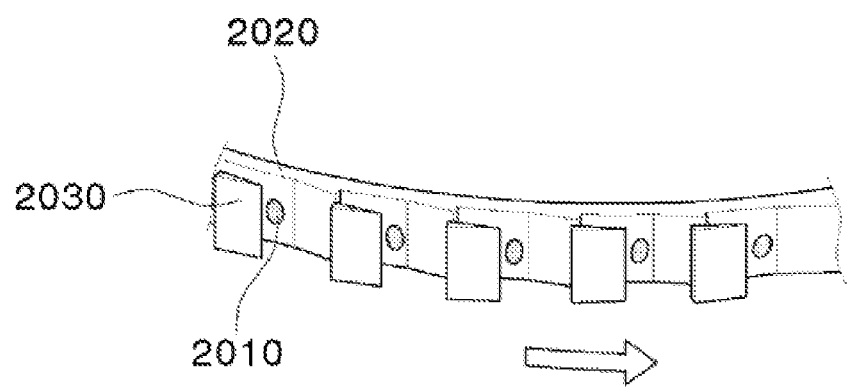

Next, referring to FIGS. 18 to 20, variable substance containers 1810, 1910, and 2010 and movable parts 1830, 1930, and 2030, which are attached to objects of forgery and falsification prevention, can be irreversibly separated from each other. The variable substance containers 1810, 1910, and 2010 and movable parts 1830, 1930, and 2030 are irreversibly separated by an external stimulus that is induced when the objects of forgery and falsification prevention are opened, and therefore the variable substance containers 1810, 1910, and 2010 do not indicate any predetermined display states after the objects of forgery and falsification prevention are opened.

Figure 21:
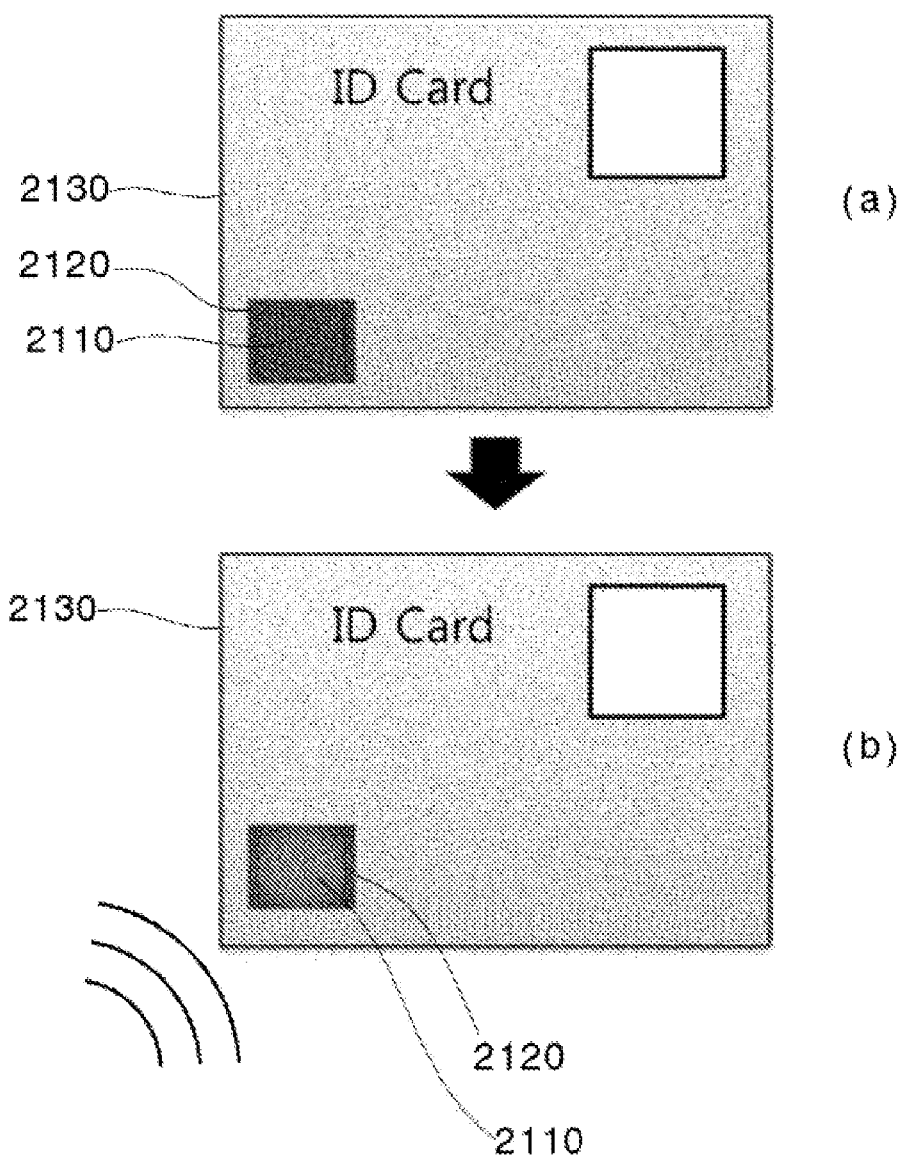

Next, referring to FIG. 21, a forgery and falsification prevention device may further include a display stimulus generator 2120 to generate an electric field as a display stimulus capable of being applied to a variable substance container 2110 when an electromagnetic wave is applied. Particularly, according to an embodiment of the present invention, the movable part 2130 is moved, rotated, or deformed in response to a given external stimulus, to position the display stimulus generator 2110 in a region where an electromagnetic wave is applied, and therefore when the display stimulus generator 2120 is positioned in a region where the electromagnetic wave is applied, an electric field generated by the display stimulus generator 2120 is applied to the variable substance container 2110, thereby changing the display state of the variable substance.

Here, the electromagnetic wave may include an electromagnetic wavelength (e.g., electromagnetic waves for wireless power transmission, or the like) generated during a near field communication (NFC) or radio frequency identification (RFID) process.

That is, according to an embodiment of the present invention, a variable substance, of which the display state can be changed by an electric field, and a means for generating an electric field by an electromagnetic wave due to NFC or RFID are provided to an identification card with NFC or RFID capability. Therefore, a user may perform an electronic identification through NFC or RFID using the identification card and perform a visual identification by monitoring a change in the display state of the variable substance.

Meanwhile, according to an embodiment of the present invention, the display stimulus generator 2120 may generate an electric field by using electromotive force generated by a separate battery or solar cell as well as the aforementioned electromagnetic wave.

Meanwhile, a forgery and falsification prevention device according to an embodiment of the present invention may further include an additional forgery and falsification prevention means using at least one of a hologram, radio frequency identification (RFID), and biometric information recognition. As a result, forgery and falsification of an object may be prevented more efficiently.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes can be made from the above description.

Accordingly, the spirit of the present invention shall not be limited to the above-described embodiments, and the entire scope of the appended claims and their equivalents will fall within the spirit and scope of the invention.

The invention claimed is:

1. A forgery and falsification prevention device, comprising:
   a variable substance container to contain a variable substance in which a reflected light or transmitted light is changed as a display stimulus is applied thereto; and
   a movable part to perform a function of changing a display state of the variable substance by changing light reflection characteristics or light transmission characteristics of the variable substance or changing the display stimulus applied to the variable substance, in response to a given external stimulus,
   wherein the variable substance includes a first medium having a first refractive index and a second medium having a second refractive index,
   wherein the first medium and the second medium are regularly arranged,
   wherein the particles having a refractive index different from the first refractive index are dispersed in the first medium, and
   wherein at least one of the first medium and the second medium where particles are dispersed is scattered in the form of a droplet within a light-transmissive material.

2. The forgery and falsification prevention device of claim 1, wherein the display stimulus includes at least one of an electric field, a magnetic field, temperature, humidity, pressure, and light.

3. The forgery and falsification prevention device of claim 1, wherein the movable part is moved, rotated, or deformed in response to the given external stimulus to change at least one of intensity, direction, and pattern of the display stimulus applied to the variable substance.

4. The forgery and falsification prevention device of claim 3, wherein the movable part is moved, rotated, or deformed in response to the given external stimulus to position the variable substance container in a region where the display stimulus is applied.

5. The forgery and falsification prevention device of claim 3, wherein the movable part is moved, rotated, or deformed in response to the given external stimulus to position the variable substance contained in the variable substance container in a region where the display stimulus is applied.

6. The forgery and falsification prevention device of claim 3, further comprising a display stimulus generator to generate a display stimulus operable for being applied to the variable substance container,
   wherein the movable part is moved, rotated or deformed in response to the given external stimulus to position the display stimulus generator in a region where the display stimulus can be applied to the variable substance.

7. The forgery and falsification prevention device of claim 1, wherein at least one of the variable substance container and the movable part is operable for being irreversibly fractured by the external stimulus, and
   wherein when at least one of the variable substance container and the movable part is irreversibly fractured, the light reflection characteristics or light transmission characteristics of the variable substance, which show in response to application of the display stimulus, are changed compared with before at least one of the variable substance container and the movable part is irreversibly fractured.

8. The forgery and falsification prevention device of claim 1, wherein in the variable substance container, the display state of a first region to which the display stimulus is applied is different from the display state of a second region to which the display stimulus is not applied.

9. The forgery and falsification prevention device of claim 1, wherein at least one of the variable substance container and the movable part is configured in the form of at least one of a container plug, a tag, a card, a film, a sticker, and an identification code.

10. The forgery and falsification prevention device of claim 1, wherein the variable substance includes a solution in which particles are dispersed, and the intervals or positions of the particles are changed according to the change in an electric field or a magnetic field.

11. The forgery and falsification prevention device of claim 1, wherein the variable substance includes at least one of a fluorescent material, a phosphorescent material, a quantum dot material, a temperature indicating material, and an optically variable pigment (OVP) material.

12. The forgery and falsification prevention device of claim 1, wherein the first medium and the second medium are alternately stacked.

13. The forgery and falsification prevention device of claim 1, wherein the phase or refractive index of at least one of the first medium and the second medium is changed in response to the application of the display stimulus.

14. The forgery and falsification prevention device of claim 1, wherein the first medium includes a curable material, and
   wherein when the curable material is cured while the particles are regularly arranged at predetermined intervals in the first medium by the display stimulus, the first medium is cured, and thus the state of the particles being regularly arranged at predetermined intervals in the first medium is irreversibly fixed.

15. The forgery and falsification prevention device of claim 1, further comprising an additional forgery and falsification prevention means using at least one of a hologram, radio frequency identification (RFID), and biometric information recognition.

16. The forgery and falsification prevention device of claim 1, further comprising a display stimulus generator to generate an electric field as a display stimulus operable for being applied to the variable substance container when an electromagnetic wave is applied,
   wherein the movable part is moved, rotated, or deformed in response to the application of the external stimulus, to position the display stimulus generator in a region where the electromagnetic wave is applied, and when the display stimulus generator is positioned in a region where the electromagnetic wave is applied, an electric field generated by the display stimulus generator is applied to the variable substance container, thereby changing the display state of the variable substance.

17. The forgery and falsification prevention device of claim 16, wherein the electromagnetic wave includes an electromagnetic wave generated during a near field communication (NFC) or radio frequency identification (RFID) process.

* * * * *